March 26, 1974 S. RYNG 3,799,792

VAPOR DEPOSITION METHOD

Filed Dec. 14, 1971 2 Sheets-Sheet 1

INVENTOR.

BY Stanley Ryng

Gerald B. Epstein Att'y.

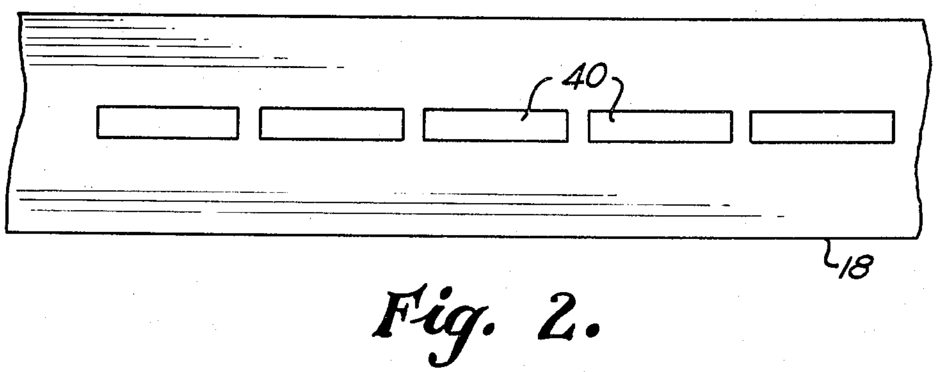
Fig. 2.
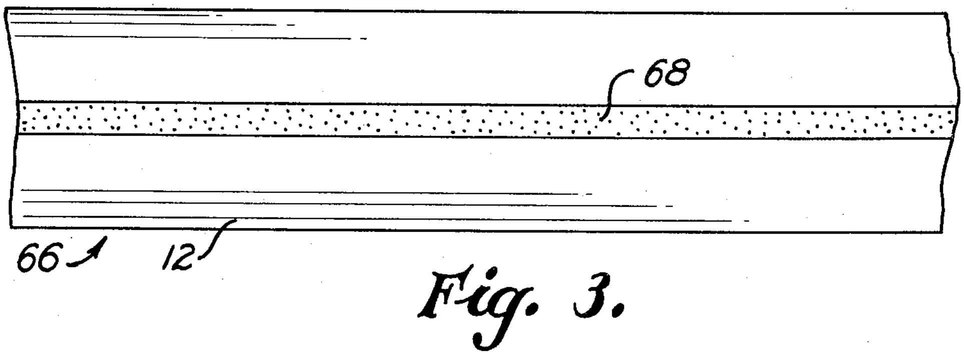
Fig. 3.
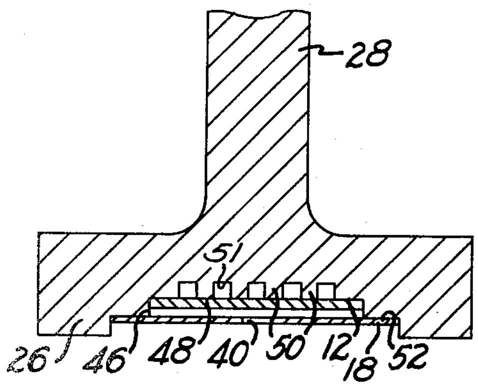
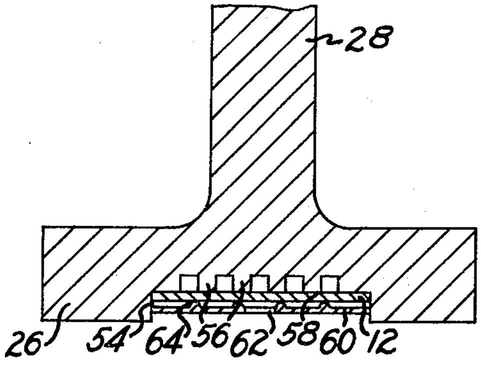
Fig. 4. Fig. 4a.
INVENTOR.
BY Stanley Ryng
Gerald B. Epstein Att'y.

United States Patent Office 3,799,792
Patented Mar. 26, 1974

3,799,792

VAPOR DEPOSITION METHOD

Stanley Rying, North Attleboro, Mass., assignor to Texas Instruments Incorporated, Dallas, Tex.

Filed Dec. 14, 1971, Ser. No. 207,795
Int. Cl. C23c *13/04*
U.S. Cl. 117—43 6 Claims

ABSTRACT OF THE DISCLOSURE

A method is disclosed for depositing a pattern of material onto a substrate. The substrate is conveyed through a deposition station at which vapors of the vaporizable material are directed toward a surface of the substrate. A mask having a preselected pattern of apertures therein is also conveyed through the deposition station intermediate the one surface of the substrate and the vapors in order to selectively expose preselected portions of the surface of the substrate to the vapors to permit deposition of the vapors thereon. The mask and the substrate are moved through the deposition station at different relative velocities.

The present invention relates generally to deposition of material onto a surface of a substrate and more particularly is directed to an improved method for depositing a vaporizable material in a preselected pattern onto a substrate.

Various methods are currently available for depositing a material onto a substrate. For example, various types of chemical deposition processes may be utilized in which a suitable mask is initially provided utilizing photoengraving techniques. In such a process the mask is provided by initially coating an entire surface of the substrate with photosensitive material which is selectively exposed to light and etched to effect removal of selected portions of the coating to define a mask. Deposition may be effected through apertures in the mask, after which the mask is removed and discarded. Similarly, the material may be directly deposited onto the substrate through suitable apertures or slots in a preformed mask which selectively exposes the portions of the substrate to be coated. The former method is often time consuming and relatively expensive and is usually unsuitable for use in conjunction with a continuously moving substrate. The latter technique is less expensive and time consuming, but may often cause substantial inaccuracies in the geometry of the pattern of the coating on the substrate particularly, when a pattern is being formed on a continuously moving substrate, for example. In the latter situation the most prevalent problem is the variance in the size of the apertures in the mask due to vapor deposition on the mask material itself, resulting in variations in the size of the openings. This requires frequent stoppage of the process and cleaning of the mask to remove the deposited material. Particularly when utilizing a continuous vacuum deposition system such process stoppages cause a dramatic drop in production rate due to the large time intervals which are required when the integrity of the vacuum system is disturbed.

Accordingly, it is an object of the present invention to provide an improved method for depositing a vaporizable material onto a substrate.

It is another object of the present invention to provide an improved method for depositing a preselected pattern of a vaporizable material onto a substrate, which method is relatively economical and efficient in use.

It is a further object of the present invention to provide an improved method for depositing a continuous stripe of a vaporizable material onto a continuously moving substrate in which a relatively high degree of resolution of the dimensions of the stripe relative to the substrate is preserved.

Various additional objects and advantages of the present invention will become readily apparent from the following detailed description and accompanying drawings wherein:

FIG. 1 is a view taken along lines 2—2 of FIG. 1 illustrating the mask material;

FIG. 3 is a view taken along lines 3—3 of FIG. 1 illustrating a portion of the completed material subsequent to the vapor deposition procedure;

FIG. 4 is a view taken along lines 4—4 of FIG. 1 illustrating certain details of the apparatus for carrying out the method of the present invention so as to show the manner in which the substrate and mask are driven; and FIG. 4*a* is an alternate embodiment of the portion of the apparatus illustrated in FIG. 4 showing an alternate method for driving the substrate and the mask.

Figure 1:
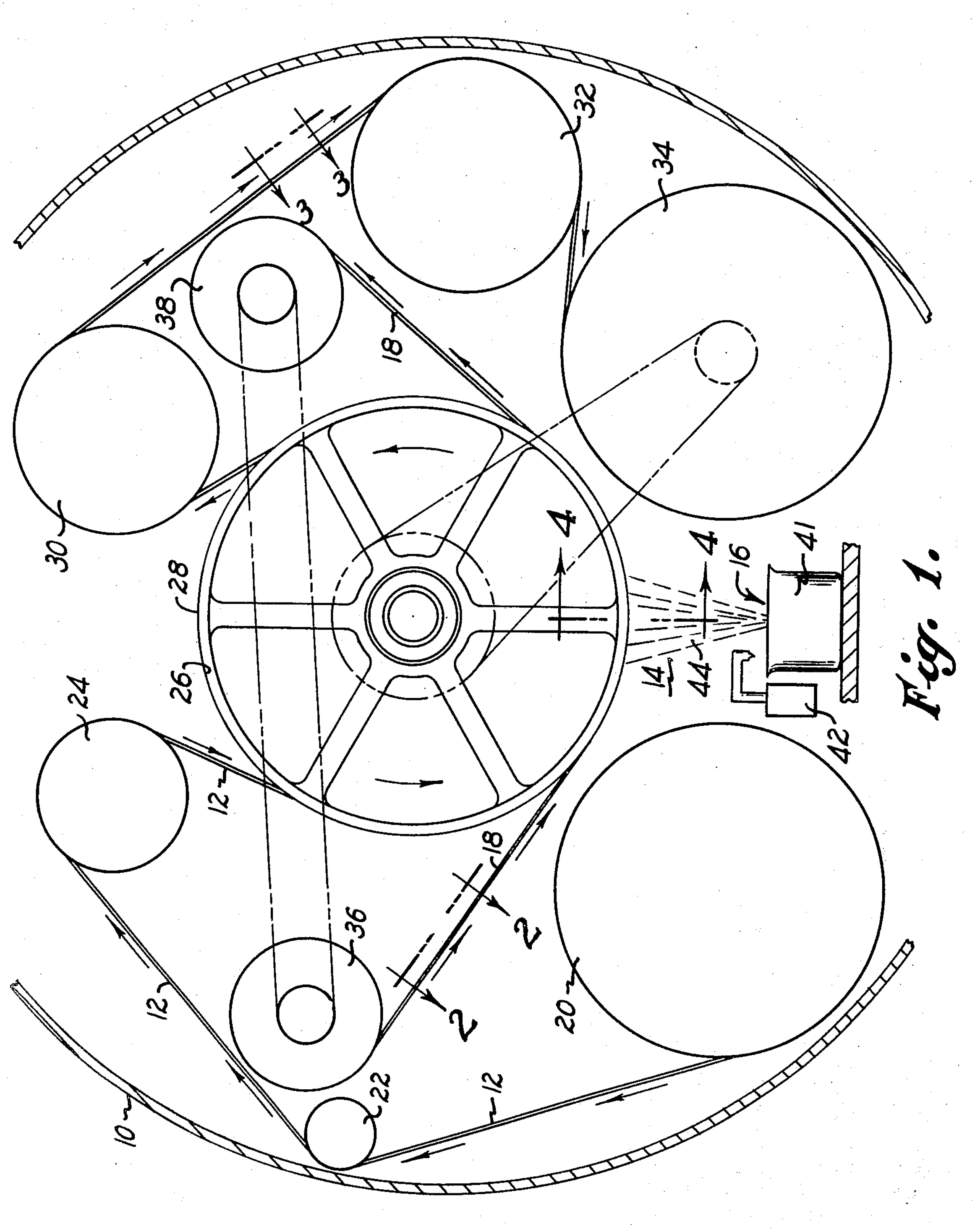
FIG. 1 is a vertical elevational view within the interior of a reactor illustrating the method of the present invention.

Referring generally to the drawings and initially to FIG. 1 an apparatus is illustrated for carrying out the method in accordance with the present invention. More particularly, the apparatus includes a suitable reactor or chamber 10 (partially shown) adapted to be evacuated to a pressure suitable for deposition processes, such as approximately between $10^{-4}$ to $10^{-5}$ forr. A substrate material 12 disposed within the chamber 10 is passed through a deposition station within the chamber 10 indicated generally by the reference numeral 14 at which a source of vapors 16 is provided for directing vapors of a material to be deposited in a preselected pattern onto the substrate toward a surface of the substrate. A mask 18 is also passed through the deposition station 14 intermediate the one surface of the substrate and the source of vapors for selectively exposing preselected regions of the one surface of the substrate to the vapors. Furthermore, in accordance with an extremely significant feature of the present invention the mask 18 and the substrate 12 are passed through the deposition station at different velocities relative to each other.

More particularly, the substrate 12 preferably comprises an elongated continuous strip of a material which is selected in accordance with the anticipated end use which is contemplated for the coated product. For example, the method in accordance with the present invention is particularly adapted for processing a continuous strip of substrate material to deposit a centrally arranged longitudinally extending stripe of a selected conductive material on the substrate to provide a product for use in fabricating lead frames for integrated circuit devices, or the like, which are subsequently punched out of the coated substrate. In such instances the substrate 12 may comprise a material such as that commonly sold under the trade name Kovar, which comprises by weight approximately 20 percent nickel, 17 percent cobalt, 0.2 percent manganese, and the balance iron, while a suitable coating of a conductive material having good anti-corrosive properties such as gold, silver, aluminum, copper, etc. may be deposited thereon in the form of a continuous stripe. Similarly, if desired, the substrate material 12 may comprise a suitable non-conductive material such as a polymer which is similarly to be provided with a preselected pattern deposited thereon, such as a continuous or discontinuous longitudinally extending stripe of a vaporizable material in accordance with the process of the present invention. A typical example of such a material comprises the polymide polymer film sold by E. I. du Pont de Nemours and Companyy under the trade name Kapton, which comprises a polypyromellitimide film which results from the polycondensation reaction between pyromellitic dianhydride and an aromatic diamine and and may be provided in suitable film form of a desired thickness. Furthermore, in certain instances it may be desirable to provide a substrate material having good thermal conduction properties such as copper. In any event, the substrate material 12 is preferably carried in coiled form on a reel or spool 20 and extends from the spool 20 past a suitable idler wheel 22 and over a guide wheel 24, as shown, for guiding the strip of substrate material 12 tangentially onto the outer circumferential surface of a rim 26 of a main drive wheel 28. The drive wheel 28 is arranged to provide the main driving force for conveying the substrate material 12 through the deposition station 14 to permit the deposition of a preselected pattern of the vaporizable material thereon, as will be more fully explained hereinafter. After exiting from the deposition station 14 the the coated substrate material 12 is conveyed onto a guide reel 30 which is tangentially aligned with the drive wheel 28 adjacent the deposition station. The coated substrate material 12 is then conveyed onto an idler wheel 32 and finally onto a takeup reel 34 which is mechanically linked to the main drive wheel 28 so that it operates at a speed systematically related to the speed of revolution of the drive wheel in order to efficiently receive the coated substrate material thereon.

The mask material 18 similarly to the substrate material 12 preferably comprises an elongated strip of material, a portion of which is shown in FIG. 2, and is preferably adapted to be carried on a suitable reel or spool 36 which may be disposed within the chamber 10, as shown. The mask 18 is conveyed through the deposition station 14 and after exiting therefrom subsequent to the deposition procedure is received on a takeup reel 38 arranged to receive the waste mask material. As may be seen the supply reel 36 and the takeup reel 38 are preferably drivingly linked to each other so as to facilitate appropriately adjusting the speed of passage of the mask material 18 through the deposition station. In addition, the speed at which the mask material travels is controlled by sliding engagement with the outer circumferential surface of the drive wheel 28 as it passes through the deposition station 14, as will be more fully explained hereinafter. As shown, particularly in FIG. 2, the mask material 18 is provided with a plurality of apertures or slots 40. Although the aperatures 40 may be provided in any desired pattern or configuration so as to control the pattern of deposition of the vapor onto the substrate, in the embodiment illustrated the apertures 40 are arranged in closely spaced, longitudinally aligned relationship and are generally centrally located along the strip of mask material 18. As a result a generally centrally extending coating may be deposited on the surface of the substrate material 12 which is selectively exposed through the apertures 40. In this regard the mask material 18 is conveyed through the deposition station 14 intermediate the surface of the substrate material 12 onto which the coating is to be deposited and the source of vapors 16 so that the mask 18 prevents the vapor coating from contacting surface regions of the substrate other than the surface regions exposed through the apertures 40. In addition, the mask material 18 preferably has a somewhat larger transverse dimension than the substrate material 12 so as to assure accurate deposition of the vapor material. The mask material may be fabricated of any desired relatively inexpensive material which functions to prevent the deposition of the vapor material onto regions of the substrate other than those regions exposed by the apertures 40. The mask 18, thus, may be fabricated of any one of a variety of relatively inexpensive low carbon steels which are available in relatively thin strip form, such as S.A.E. Type 1008 steel, for example, which comprises by weight approximately 0.10 percent (max.) carbon, 0.25–0.50 percent manganese, 0.040 percent (max.) phosphorous, 0.050 percent (max.) sulphur, and the balance iron. It should be noted that the mask material 18 may be appropriately disposed of after it has passed through the deposition station 14 and has been received on the takeup reel 38 or, alternatively, in certain instances it may be reused for similar masking operations. In this connection since the mask material 18 is in contact with the vapors for only a relatively brief interval of time as it is conveyed through the deposition station 14, the dimensions of the apertures may not be affected by the vapors, thereby permitting reuse of the mask material so as to further decrease the cost of the process.

The source of vapor 16 preferably comprises a suitably supported cruciable 41 such as a graphite lined cup which carries a supply of a suitable vaporizable material adjacent the deposition station 14. In the illustrated embodiment a vaporizable material is selected which has good electrical contact and corrosion resistant properties and may be vaporized by the application of intense heating, such as aluminum, gold, silver, copper, etc. The requise heating of the vaporizable material may be provided in various ways, but in the illustrated embodiment a heating source 42 is provided which preferably comprises a suitable high voltage electron gun adapted to direct a high energy beam of electrons onto the material within the crucible so as to effect vaporization of the material in order to establish a vapor atmosphere 44 at the deposition station. The crucible 41 is arranged adjacent the deposition station 14 so that the particles comprising the vaporous atmosphere 44 tend to rise into the area defined by the deposition station 14 which in the illustrated embodiment is vertically upwardly spaced from the surface of the crucible. If other orientations are desired, or if it is desired to more accurately control the direction of movement of the particles comprising the vaporous atmosphere 44 a suitable electrical field may be established in the chamber 10. Similarly, suitable shields or baffles (not shown) may be provided within the chamber 10 in order to prevent undue scattering of the particles comprising the vaporous atmosphere 44.

In accordance with an important aspect of the present invention the spbstrate material 12 is conveyed through the deposition station as a result of frictional engagement between the surface of the substrate opposite to that on which the vapor material is coated and a portion of the outer circumferential surface of the drive wheel 28. The mask material 18 is in closely spaced relationship with the substrate material 12 as the mask and the substrate traverse the deposition station. In this regard the mask 18 is carried intermediate the surface of the substrate material on which the deposition is to be effected and the vaporous atmosphere 44, but the mask material 18 slidingly engages a portion of the outer circumferential surface of the drive wheel 28 to cause the mask material 18 to pass through the deposition station 14 at a different velocity relative to the velocity of the substrate material and preferably at a substantially slower velocity, thereby conserving the usage of mask material relative to the amount of coated substrate product. More particularly, referring to FIG. 4 it may be seen that the rim 26 of the drive wheel 28 includes a step shaped groove 46 which extends radially inwardly from the outer circumferential surface of the rim to define a first bearing surface 48 which is illustrated as comprising a plurality of teeth 50 for positively engaging the surface of the substrate 12 opposite to the surface which is to be coated with the vapor material. In addition grooves 51 are provided intermediate the teeth 50 to minimize heat loss from the substrate 12 in the event the substrate is externally heated prior to entering the deposition station. In addition, the step shaped groove 46 defines another bearing surface 52 which is spaced radially outwardly from the bearing surface 48 and which slidingly engages the mask material 18 so that revolution of the drive wheel 28 may positively drive the substrate material 12 through the deposition station 14 due to the positive frictional engagement therewith, while driving the mask material 18 through the deposition station at a lesser relative velocity due to the sliding engagement which is established therewith. In addition, adjustment of the velocity of the mask material 18 as it passes through the deposition station 14 is also achieved by suitably controlling the speeds of revolution of the supply reel 36, which carries the virgin mask material, and the takeup reel 38, which receives the mask material subsequent to the deposition procedure. The supply reel 36 and the takeup reel 38 also are mechanically linked so as to facilitate adjustment of the speed of passage of the mask material through the deposition station 14. It has been found that the speed of movement of the substrate relative to the speed of movement of the mask material through the deposition station may vary between the ratio of between approximately 2:1 and 20:1 in order to achieve satisfactory results in regard to the uniformity and accurate definition of the coating which is produced, while otbaining a process which is extremely economical in operation by virtue of the conservation of mask material which results.

An alternate embodiment of a suitable drive wheel configuration is illustrated in FIG. 4*a* in which the rim 26 of the drive wheel 28 is provided with a single generally centrally located groove 54 which extends radially inwardly from the outer circumferential surface of the rim 26 and terminates in a plurality of teeth 56 which define a bearing surface 58 which frictionally engages the substrate material 12 as it passes therethrough so as to positively drive the substrate material through the deposition station 14. A mask material 60 similar to the mask material 18 includes a plurality of apertures 62 for selectively exposing the substrate 12 similar to the apertures 40. However, the mask material 60 includes a plurality of projecting members or bosses 64 which extend from the surface thereof which faces the substrate material and are adapted to slidingly engage the substrate material. Further, the mask material 64 is received in the groove 54 in common with the substrate material 12, but the bosses 64 maintain the proper spaced relationship between the substrate material 12 and the mask material 60 and function to define a bearing surface between the substrate surface and the mask material 60 so that the mask may be slidingly driven through the deposition station 14 by the revolutional movement of the drive wheel 28.

Referring to FIG. 3 a portion of a completed end product is indicated generally by the reference numeral 66 and, as shown, the substrate material 12 has been provided with a generally continuous, centrally arranged longitudinally extending, coating 68 of the vaporizable material on one surface thereof as a result of passage through the deposition station. This strip of material 66 is received on the takeup reel 34 and is then ready for further processing. For example, the material may be stamped into a suitable lead frame with the coated portion 68 providing contact areas which have improved electrical contact properties.

If desired, the mask material 18 may be provided with other varying aperture patterns so as to provide other coating configurations depending on the anticipated ultimate use of the product.

Thus, a unique method has been described in detail for depositing a vaporizable material in a preselected pattern onto the surface of a substrate.

Various additional changes and modifications in the above described invention will be readily apparent to those skilled in the art and any of such changes or modifications are deemed to be within the spirit and scope of the present invention as set forth in the appended claims.

In the claims:

1. A method for depositing at least one stripe of a vaporizable material along the length of an elongated strip of a substrate comprising:

continuously passing the substrate longitudinally through a deposition station at a selected speed;

directing vapors of the vaporizable material from a source toward one surface of said substrate at said deposition station; and continuously passing an elongate strip mask having a preselected pattern of apertures spaced along the length of said mask through said deposition station at a relatively different speed intermediate said one surface of the substrate and said vapor source to selectively expose preselected regions of said one surface of the substrate to said vapors through apertures of said mask for effecting deposition of said stripe of vaporizable material thereon.

2. A method in accordance with claim 1 wherein the speed of movement of the substrate relative to the speed of movement of the mask past the deposition station varies between the ratio of between approximately two to one and twenty to one.

3. A method in accordance with claim 1 wherein said mask and the substrate are maintained in a substantially constant closely spaced relationship relative to one another during passage through said deposition station.

4. A method in accordance with claim 3 wherein projecting bearing members on said mask extend toward said one surface of the substrate in sliding engagement therewith for maintaining said substrate and mask in said substantially constant spaced relationship during passage through said deposition station at different relative speeds.

5. A method for depositing a continuous stripe of a vaporizable material onto a surface of a substrate comprising:

continuously moving an elongated strip of the substrate longitudinally past a vapor deposition station;

heating a quantity of the vaporizable material to provide a substantially continuous atmosphere of vapors thereof at said vapor depositon station and directing said vapors toward said one surface of said substrate; and continuously moving an elongated strip mask having a plurality of longitudinally spaced, aligned apertures past said deposition station intermediate said one surface of said substrate and said atmosphere of vapors at a different velocity relative to said substrate so as to selectively expose a continuous preselected region of said one surface of said substrate to said atmosphere of vapors, whereby differential movement between said substrate and said mask is produced so as to effect deposition through said spaced aligned mask apertures of a continuous stripe of said vaporizable material onto said one surface of said substrate.

6. A method in accordance with claim 5 wherein said mask is at least longitudinally and transversely dimensionally equal to said substrate so as to prevent contact between said one surface of said substrate and said atmosphere of vapors other than at the preselected regions of said one surface of said substrate exposed by said apertures, and said apertures are generally centrally arranged along said mask so as to expose a continuous generally centrally longitudinally extending surface region of said substrate to said atmosphere of vapors.

(References on following page)

References Cited

UNITED STATES PATENTS

| | | | |
|---|---|---|---|
| 3,511,212 | 5/1970 | Burns | 118—49 |
| 3,044,438 | 7/1962 | Osswald | 117—107.1 |
| 2,740,928 | 4/1956 | Ward | 117—106 |
| 3,046,936 | 7/1962 | Simons | 117—107.1 |
| 3,020,177 | 2/1962 | Alexander | 117—107.1 |

RALPH S. KENDALL, Primary Examiner

J. W. MASSIE, Assistant Examiner

U.S. Cl. X.R.

117—106 R, 212